No. 713,158. Patented Nov. 11, 1902.
J. SAVAGE.
TURBINE WATER WHEEL OF THE PARALLEL FLOW TYPE.
(Application filed Dec. 30, 1901.)
(No Model.) 2 Sheets—Sheet 1.
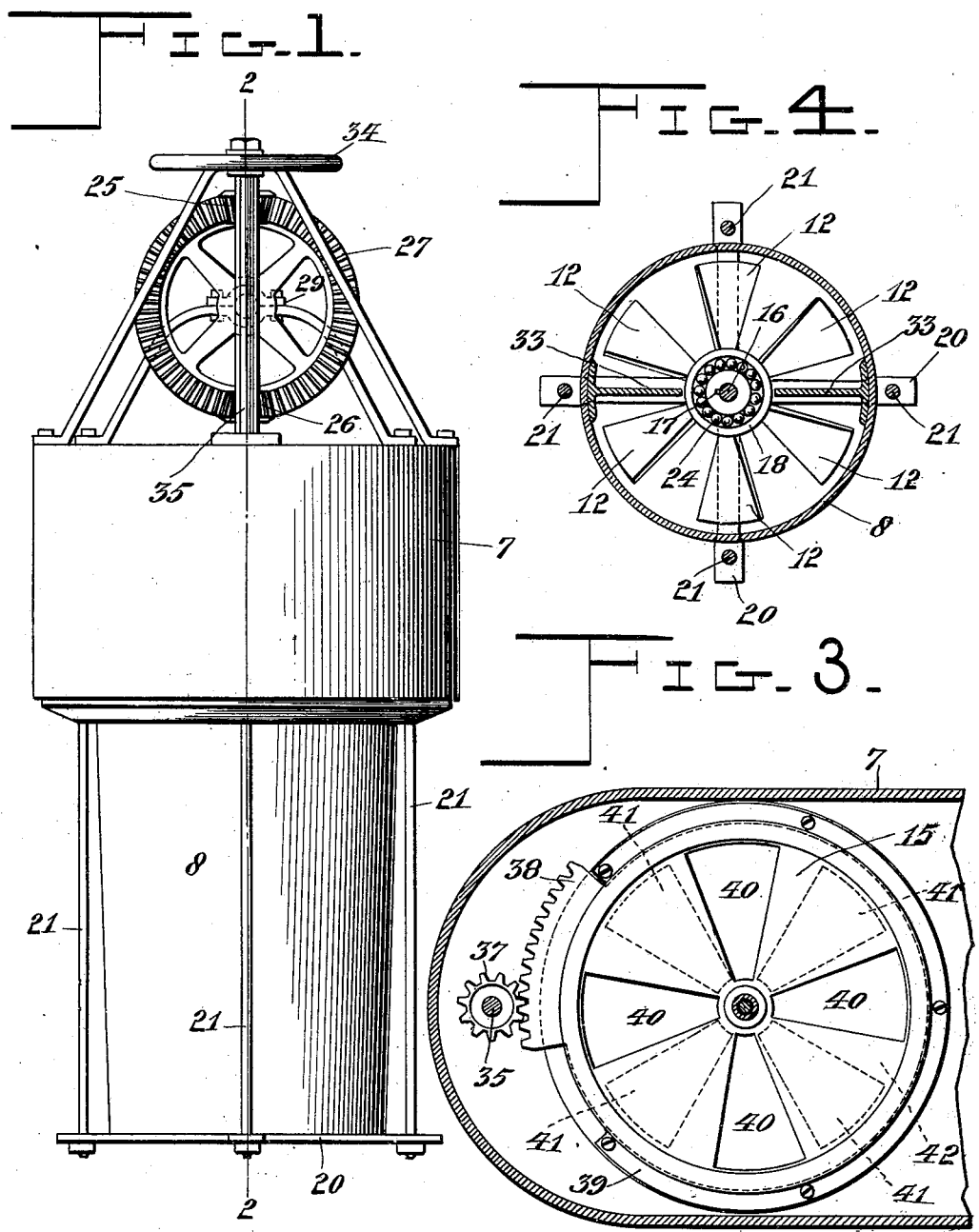
Witnesses: Joseph Savage, Inventor,
By Marion & Marion
Attorneys No. 713,158. Patented Nov. 11, 1902.
J. SAVAGE.
TURBINE WATER WHEEL OF THE PARALLEL FLOW TYPE.
(Application filed Dec. 30, 1901.)
(No Model.) 2 Sheets—Sheet 2.
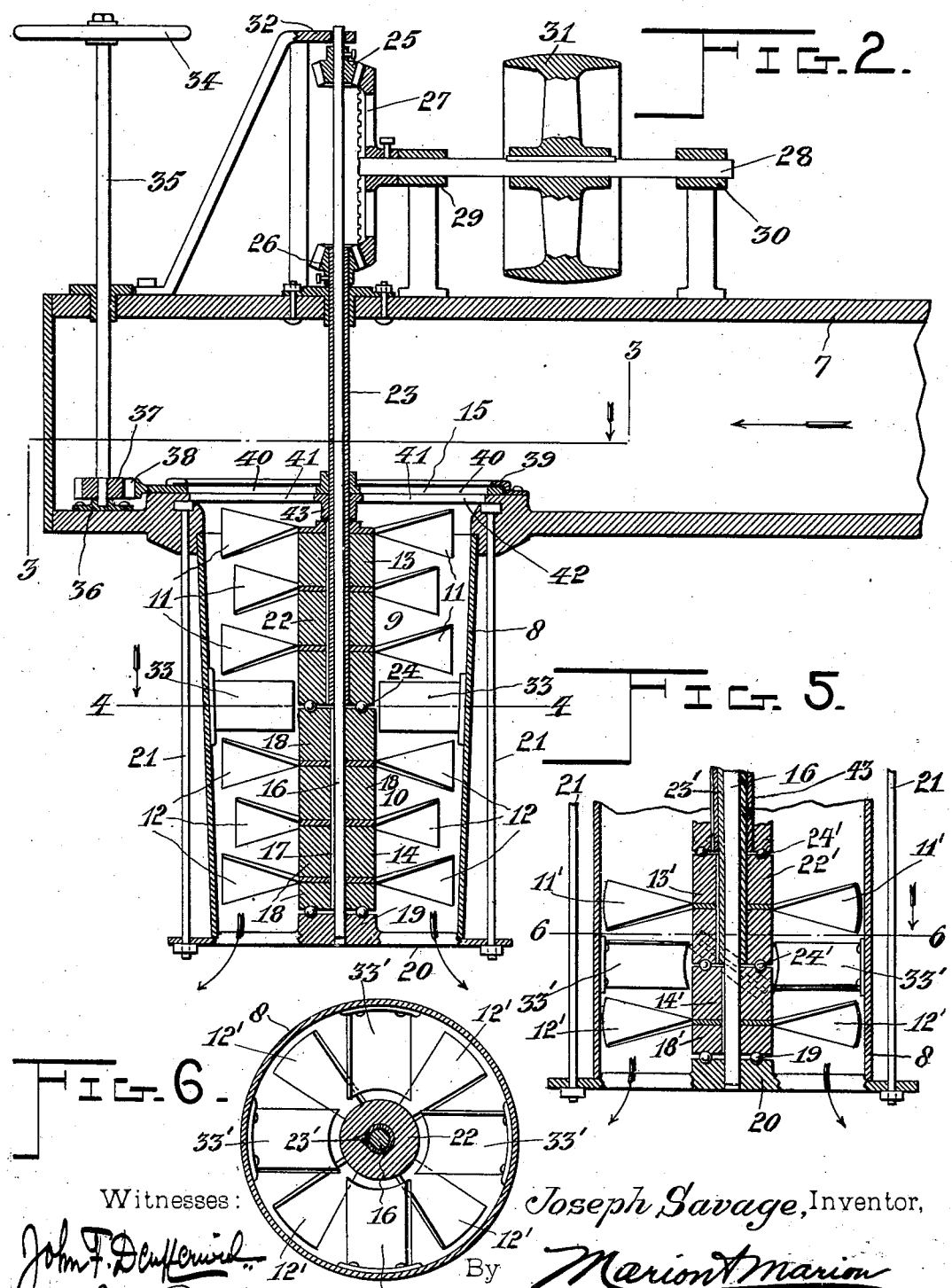
Witnesses: Joseph Savage, Inventor,
By Marion & Marion
Attorneys

UNITED STATES PATENT OFFICE.

JOSEPH SAVAGE, OF KINGSEY FALLS, CANADA.

TURBINE WATER-WHEEL OF THE PARALLEL-FLOW TYPE.

SPECIFICATION forming part of Letters Patent No. 713,158, dated November 11, 1902.

Application filed December 30, 1901. Serial No. 87,681. (No model.)

*To all whom it may concern:*

Be it known that I, JOSEPH SAVAGE, a subject of His Majesty the King of Great Britain, residing at Kingsey Falls, county of Drummond, Province of Quebec, Canada, have invented certain new and useful Improvements in Turbine Water-Wheels of the Parallel-Flow Type; and I do hereby declare that the following is a full, clear, and exact description of the invention, such as will enable others skilled in the art to which it appertains to make and use the same.

This invention relates to a turbine water-wheel of the parallel-flow type; and it has for its objects, among others, to simplify the construction and improve in the details whereby better results are obtained, as more fully hereinafter shown and described, and then particularly pointed out in the claims.

I have shown a preferred form of my improved water-wheel in the accompanying drawings, in which—

Figure 1 is a front elevation of a penstock containing my improved water-wheel, together with gate and power-transmitting mechanism connected therewith. Fig. 2 is a longitudinal central section of the same, taken on the line 2 2 of Fig. 1. Fig. 3 is a sectional plan view taken on the line 3 3 of Fig. 2. Fig. 4 is a sectional plan view taken on the line 4 4 of Fig. 2. Fig. 5 is a vertical central section of a modification of my improved water-wheel; and Fig. 6 is a horizontal section of the same, taken on the line 6 6 of Fig. 5.

The same numerals of reference denote like parts in all the figures of the drawings.

In the embodiment of the invention shown the part 7 represents a penstock-casing, through which the water passes from the flume to the wheel, as is well understood. The wheel itself is located in a tapering casing 8 and consists of two independent main portions 9 and 10, each of which carries blades or vanes 11 and 12, respectively, which extend radially from hub portions 13 and 14 and are helically arranged, so as to be acted on by the impinging water, and, moreover, the blades 12 have an opposite pitch from the blades 11, so that the water which enters through the gate 15 impinges first upon the blades 11, giving them a rotative movement in one direction and itself receiving a rotation in the opposite direction, and thereafter impinges upon the blades 12 and by reason of its rotational velocity, as well as its downward movement, imparts to the blades 12 a powerful rotation in an opposite direction from the blades 11. The blades 12 may be formed of sheet metal and provided with a central aperture and a keyed slot, by which they are mounted upon the shaft 16 and keyed thereon by a key 17. Alternating with the blades 12 are cylindrical hub-pieces 18, which constitute the hub 14 and hold the blades 12 at their proper relative distances upon the shaft. The wheel portion 10 thus built up of the blades 12 and the hub-pieces 18 is rotatably supported on a bearing 19, which is preferably a ball-bearing, as shown, and is carried by a spider 20, which extends across the bottom of the cylindrical casing 8 and is bolted in position by means of bolts 21, attached to the casing 7 of the penstock. The upper wheel portion 9 is similarly made up of alternating blades 11 and hub portions 22, but instead of being keyed to the shaft 16 is keyed to a long sleeve 23, which is loosely mounted on the shaft 16, and is thus enabled to turn independently of the latter. The wheel portion 9 rests upon the wheel portion 10, and a ball-bearing 24 is preferably provided at the junction similar to the ball-bearing 19.

The shaft 16 is extended upwardly and out through the penstock-casing 7 and carries at its upper end a bevel gear-pinion 25, while the sleeve 23 is also extended without the casing 7 and carries upon its upper end and below the pinion 25 a similar pinion 26, both of which pinions mesh with a bevel-gear 27, which is keyed or otherwise fixed to the horizontal shaft 28, supported in bearings 29 and 30 and bearing keyed thereon a main transmission-pulley 31. A collar-bearing 32 may be provided at the upper end of the shaft 16 to steady the same and keep the teeth of the pinion 25 in mesh with those of the gear 27. Now it will be seen that when the water entering through the gate 15 passes downwardly through the casing 8 it will impart to the wheel portion 9, through the medium of the blades 11, a rotative movement in a given direction, while upon striking the blades 12 of the lower portion 10 this portion will be given a rotative movement in the opposite direction, and by reason of the gear connections 25 26 27 both these movements will coöperate to turn the shaft 28 in a single direction. Moreover, the rotative movement imparted to the water by the reaction of the blades 11 will be precisely counteracted by the opposite movement imparted to it by the blades 12, so that it will issue from the bottom of the casing 8 without rotary movement, and the kinetic energy contained in the water will thus be as fully as possible extracted therefrom, while at the same time a more powerful rotative effort will be imparted to the pulley 31 than is the case in ordinary wheels.

In some cases it may be advisable to counteract to a greater or less extent the rotative movement imparted to the water by the blades 11 before the same impinges upon the blades 12, and to this end stationary blades or vanes 33 may be affixed to the inner side of the casing 8 between the two sets of blades, and they may be arranged in a vertical position, as shown by Fig. 2, or they may be obliquely pitched to any desirable extent, as shown at 33' in Figs. 5 and 6.

In order to regulate the flow of water through the wheel, a gate 15 of the register pattern is shown and may be operated by means of a handle 34, attached to a vertical shaft 35, resting in a step-bearing 36 in the interior of the casing 7 and provided at its lower end with a geared pinion 37, which meshes with a toothed sector 38, carried by the said gate 15. As shown, this gate consists of a circular valve-plate 15, which may be of sheet metal, centrally mounted over the casing 8 and held in place by an annular flanged piece 39, said valve-plate 15 having radial apertures 40, which register with corresponding apertures 41 in a similar plate 42, covering the upper extremity of the casing 8. This latter plate 42 may also carry at its center a bearing 43 for the sleeve 23. This form of valve, however, while advantageous, is not necessary to the operation of my improved water-wheel hereinbefore described and may be either omitted altogether or replaced by a different form of valve, as may seem desirable.

It will be understood that while I have shown in the drawings a wheel having but two independent portions only, yet a wheel containing any number of independent portions may be made, such portions rotating alternately in opposite directions and having interposed between each pair where desirable a set of stationary vanes, such as shown in the drawings at 33, such a modification illustrated in Figs. 5 and 6. In these figures the wheel is shown as made up of independent portions, each composed of a set of vanes 11' 12' and hub-pieces 18' 22', separated by ball-bearings 24' and the lower piece 18' resting on the spider 20 and turning on a ball-bearing 19'. In this case the lower wheeled portion 14' is keyed to the shaft 16, as before, and the next higher portion 13' to a sleeve 23', while for the upper wheel-sections additional sleeves may be provided, as exemplified at 43, such sleeves either operating independently of the main transmission-shaft or connected thereto by any suitable means known to the art.

Having thus described my invention, what I claim as new is—

1. In a water-wheel of the class described, a tapered casing provided at its lower end with a spider having a centrally-disposed ball-bearing, a shaft engaging an opening in said spider within the ball-bearing, a series of cylindrical hub-pieces keyed upon said shaft, blades interposed between said hub-pieces and helically arranged, a ball-bearing upon the uppermost hub-piece, hub portions, the lowermost one of which rests upon balls in said upper bearing, blades alternating with said hub-pieces, and helically disposed oppositely to the lowermost blades, a sleeve loosely mounted on the shaft to turn independently thereof with the uppermost blades and hub portions keyed thereto, a plate above the uppermost blade and having a bearing for said sleeve and a penstock all arranged and operating substantially as shown and described.

2. In a water-wheel of the class described, a tapered casing provided at its lower end with a spider having a centrally-disposed ball-bearing, a shaft engaging an opening in said spider within the ball-bearing, a series of cylindrical hub-pieces keyed upon said shaft, blades interposed between said hub-pieces and helically arranged, a ball-bearing upon the uppermost hub-piece, hub portions, the lowermost one of which rests upon balls in said upper bearing, blades alternating with said hub-pieces, and helically disposed oppositely to the lowermost blades, a sleeve loosely mounted on the shaft to turn independently thereof with the uppermost blades and hub portions keyed thereto, a plate above the uppermost blade and having a bearing for said sleeve, stationary blades on the inner wall of said casing between the two sets of helically-disposed blades and disposed at an angle to the adjacent blades of both sets, and a penstock all arranged and operating substantially as shown and described.

In witness whereof I have hereunto set my hand in the presence of two witnesses.

JOSEPH X SAVAGE.
his  mark

Witnesses:
F. A. BRIEN,
C. V. RIVES.